United States Patent [19]

Tuan et al.

[11] Patent Number: 4,584,592

[45] Date of Patent: Apr. 22, 1986

[54] MARKING HEAD FOR FLUID JET ASSISTED ION PROJECTION IMAGING SYSTEMS

[75] Inventors: Hsing C. Tuan; Malcolm J. Thompson, both of Palo Alto, Calif.

[73] Assignee: Xerox Corporation, Stamford, Conn.

[21] Appl. No.: 639,983

[22] Filed: Aug. 13, 1984

[51] Int. Cl.$^4$ ............................................. G01D 15/06
[52] U.S. Cl. .................... 346/159; 346/155; 358/300
[58] Field of Search ......................... 346/154, 155, 159; 358/296, 300

[56] References Cited

U.S. PATENT DOCUMENTS 4,400,709 8/1983 de Kermadec et al. ........ 346/155 X
4,463,363 7/1984 Gundlach et al. .

Primary Examiner—E. A. Goldberg
Assistant Examiner—A. Evans
Attorney, Agent, or Firm—Serge Abend

[57] ABSTRACT

A fluid jet assisted ion projection electrographic marking apparatus including a marking head having integrally fabricated thereon, an array of modulating electrodes, divided into sections, address bus lines, data bus lines and suitable thin film switches, for sequentially bringing the electrodes of a selected section to a predetermined voltage during a portion of the line scan time. The electrodes of non-selected sections in conjunction with the thin film switches, hold the predetermined voltage for controlling the passage of ions, exiting the apparatus, during the remainder of the line scan time.

12 Claims, 4 Drawing Figures

MARKING HEAD FOR FLUID JET ASSISTED ION PROJECTION IMAGING SYSTEMS

This invention relates to a fluid jet assisted ion projection electrographic marking apparatus and, in particular, a marking head incorporating ion modulating electrodes, multiplexed driver circuitry, and thin film transistor switching elements integrated upon a single substrate. The multiplexed driver circuitry connects an array of modulating electrodes to a small number of address and data lines for loading "writing" control information onto the electrodes.

A fluid jet assisted ion projection printer, of the type utilized herein, is disclosed in commonly assigned U.S. Pat. No. 4,463,363 issued on July 31, 1984 in the names of Robert W. Gundlach and Richard L. Bergen, entitled "Fluid Jet Assisted Ion Projection Printing". In that printer, an imaging charge is placed upon a moving receptor sheet, such as paper, by means of a linear array of closely spaced minute air "nozzles". The charge, comprising ions of a single polarity (preferably positive), is generated in an ionization chamber by a high voltage corona discharge and is then transported to and through the "nozzles" where it is electrically controlled, within each "nozzle" structure, by an electrical potential applied to modulating electrodes therein. Selective control of the modulating electrodes in the array will enable spots of charge and absence of charge to be deposited on the receptor sheet for subsequent development.

A typical modulating structure for this type of printer is disclosed in copending U.S. patent application Ser. No. 481,132 filed Apr. 1, 1983 in the names of Nicholas K. Sheridan and Michael A. Berkovitz and entitled "Modulation Structure For Fluid Jet Assisted Ion Projection Printing Apparatus", also assigned to the same assignee as the present invention. A planar marking head is mounted on the ion generating housing and each electrode thereon is addressed individually, for modulating each "nozzle" independently.

A low cost printer of the type described in the two above-identified copending applications could be manufactured if the cost of the marking head were substantially reduced. The marking head should be of page width, i.e. about 8.5 inches wide and for high quality printing should have a resolution of 200 to 400 spots per inch (spi). Therefore, the marking head would include an array of 1700 to 3400 modulation electrodes. In order to simplify, and thereby reduce the cost, the head should incorporate a multiplexed addressing scheme. Such a scheme would necessitate the use of switching elements associated with each modulation electrode. Thus, a low cost marking head would desirably include the electrode array, address lines, data lines and thin film active switching elements fabricated upon a single low cost substrate.

Present day printed circuit technology readily enables the fabrication of the electrode array, address lines and data lines on a PC board or equivalent low cost substrate. Mounting the active elements on the substrate is less economically feasible. While integrated circuit technology readily enables the fabrication of switching elements on crystalline silicon chips, crystalline silicon technology normally is size limited. When incorporating IC chips onto a PC board marking head, the most practical way for them to be mounted is to interconnect them with the electrodes by standard wire bonding techniques. Alternatively, large area crystalline silicon technology could probably enable larger circuit dimensions, presumably of page size scale, however, as cost is the driving factor, neither the IC nor the largescale crystalline silicon approach is economically feasible. The former because of the costs associated with the wire bonding procedure, and the latter because of the high cost of this new technology.

Therefore, it is the primary object of this invention to provide an inexpensive marking head having integrally fabricated thereon the modulating electrodes, address and data bus lines and active thin film devices.

Another object of this invention is to provide a marking head integrally fabricated with amorphous silicon thin film transistors as switching elements, which are uniquely compatible with the "writing" time requirements of the present printing process and are simple and inexpensive to produce in large area arrays by standard thin film deposition processes.

A further object of the present invention is the incorporation upon the marking head of a multiplexed electrode loading scheme for bringing the modulating electrodes to the desired voltage during a short segment of line "writing" time, while allowing the printing process to be accomplished continuously during the remainder of the line "writing" time.

The present invention may be carried out, in one form, by providing a fluid jet assisted electrographic marking apparatus for placing electrostatic charges upon a charge receptor surface in an image-wise pattern. The apparatus includes a source of transport fluid, such as air, for delivering the fluid to the inlet channel of a housing having an upstream ion generation region, a downstream ion modulation region, and an ion modulation structure, located at the ion modulation region adjacent an outlet channel, which controls the passage of ions exiting the housing, in accordance with the image-wise pattern. The ion modulation structure comprises a marking head bearing an array of charge storage electrodes, divided into sections, and positioned in the path of the transport fluid, data buses for applying charging voltages to the sections in accordance with the image-wise pattern, and address buses and associated switches for selectively and sequentially coupling sections to be charged to the data buses and for isolating nonselected sections from the data buses. The marking head includes a substrate upon which is integrally fabricated the charge storage electrodes, the data buses, the address buses and active thin film switches. Thus, the selected sections are rapidly brought to the predetermined control voltage when coupled to the data buses and, after being isolated from the data buses, will hold the voltage for the remainder (i.e. substantially the entire) of the line time.

Other objects and further features and advantages of this invention will be apparent from the following, more particular, description considered together with the accompanying drawings, wherein.

Figure 1:
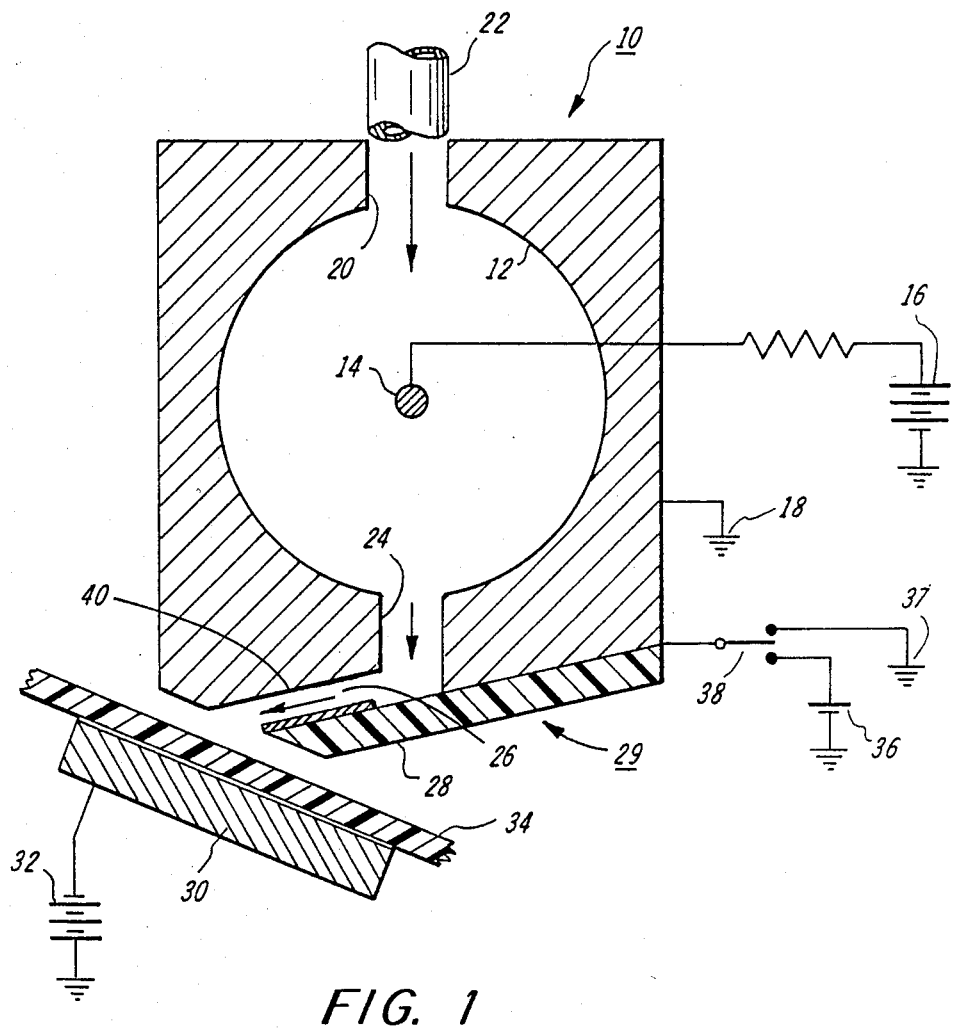
FIG. 1 is a partial cross-sectional elevation view showing the fluid jet assisted ion projection printing apparatus.

With particular reference to the drawings, there is illustrated FIG. 1 the housing 10 of the fluid jet assisted ion printing apparatus of assignee's copending U.S. patent application Ser. No. 481,132. Within the housing 10 is an ion generation region including an electrically conductive cylindrical chamber 12, a corona wire 14, extending substantially coaxially in the chamber, a high potential source 16, on the order of several thousand volts DC, applied to the wire 14, and a reference potential source 18, such as ground, connected to the wall of chamber 12. The corona discharge around the wire creates a source of ions, of a given polarity (preferably positive), which are attracted to the grounded chamber wall and fill the chamber with a space charge.

An axially extending inlet channel 20 delivers pressurized transport fluid (preferably air) into the chamber 12 from a suitable source, schematically illustrated by the tube 22. An axially extending outlet channel 24 conducts the transport fluid from the corona chamber 12 to the exterior of the housing 10, past an ion modulation region 26. As the transport fluid passes through and exits the chamber 12, through outlet channel 24, it entrains a number of ions and moves them past ion modulation electrodes 28, on the marking head 29, in the ion modulation region 26.

Ions allowed to pass completely through and out of the housing 10, through the outlet channel 24, come under the influence of accelerating back electrode 30 which is connected to a high potential source 32, on the order of several thousand volts DC, of a sign opposite to that of the corona source 16. A charge receptor 34 moves over the back electrode 30 and collects the ions upon its surface. Subsequently the latent image charge pattern may be made visible by suitable development apparatus (not shown). Alternatively, a transfer system may be employed, wherein the charge pattern is applied to an insulating intermediate surface such as a dielectric drum. In such a case, the latent image charge pattern may be made visible by development upon the drum surface and then transferred to an image receptor sheet.

Figure 2:
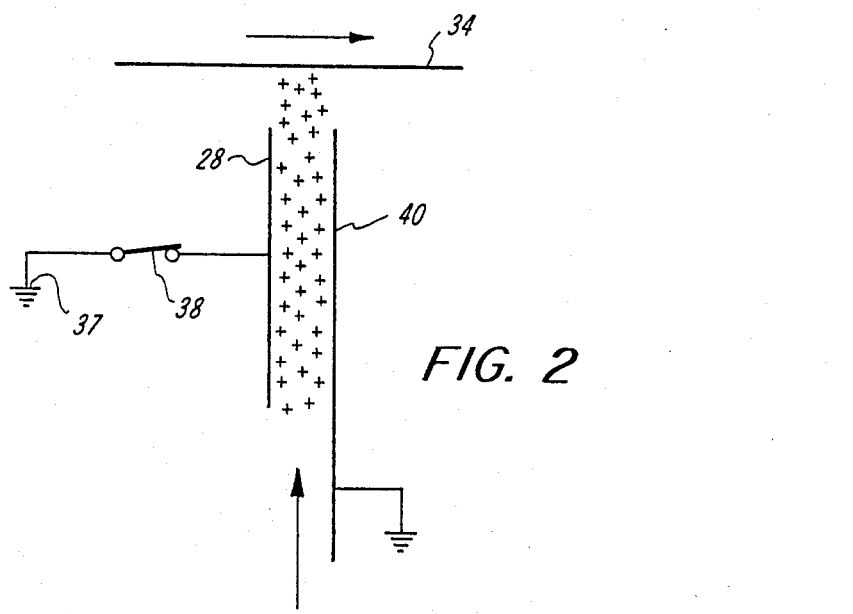
FIG. 2 is a schematic representation of the modulation structure showing "writing"
Figure 3:
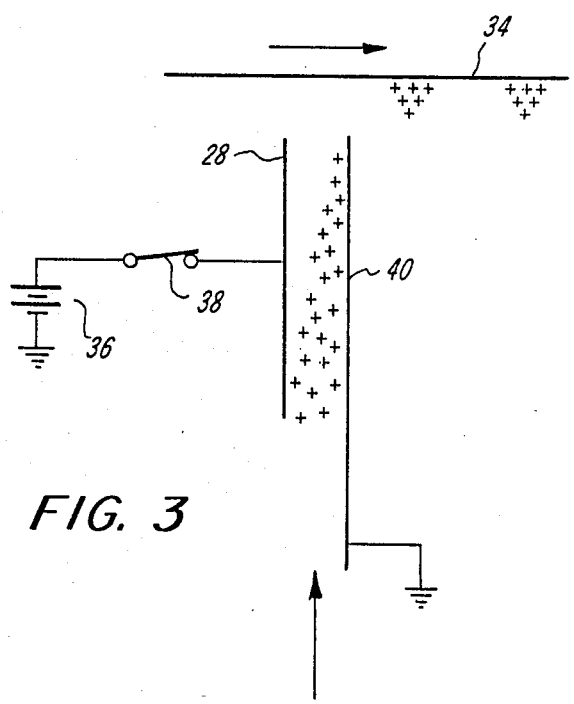
FIG. 3 is a schematic representation of the modulation structure showing "writing" being inhibited.

Once the ions have been swept into the outlet channel 24 by the transport fluid, it becomes necessary to render the ion-laden fluid stream intelligible. This is accomplished in the modulation region by individually switchable modulation electrodes 28, each connected to a low voltage source 36 (on the order of ten to twenty volts DC) and a reference potential 37 (which may be ground) through a switch 38. A schematic representation of the modulation region is illustrated in FIGS. 2 and 3. The modulation electrode 28 and the grounded opposite wall 40, which bridge the gap across the outlet channel, comprise a capacitor, across which the low voltage potential of source 36 may be applied, when connected through switch 38. Thus, an electric field, extending in a direction transverse to the direction of the transport fluid flow, is selectively established between a given modulation electrode 28 and the grounded opposite wall 40.

"Writing" of a selected spot is accomplished by connecting a modulation electrode to the reference potential source 37 so that the ion "beam", passing between the electrode and its opposite wall, will not be under the influence of a field therebetween. This condition is illustrated in FIG. 2. Conversely, when the modulation electric field is applied, by closing switch 38 and application of the low voltage potential of source 36 to the electrode 28, a charge of the same sign as the ionic species is imposed upon the electrode. The ion "beam" will be repelled (as illustrated in FIG. 3) and driven into contact with the opposite, electrically grounded, conductive wall 40 where the ions recombine into uncharged, or neutral air molecules. Transport fluid exiting from the ion projector, in that "beam" zone, will carry no "writing" ions. Thus, an image-wise pattern of information is formed by selectively controlling each of the modulation electrodes in the array, so that the ion "beams" associated therewith either exit or are inhibited from exiting the housing, as desired.

Figure 4:
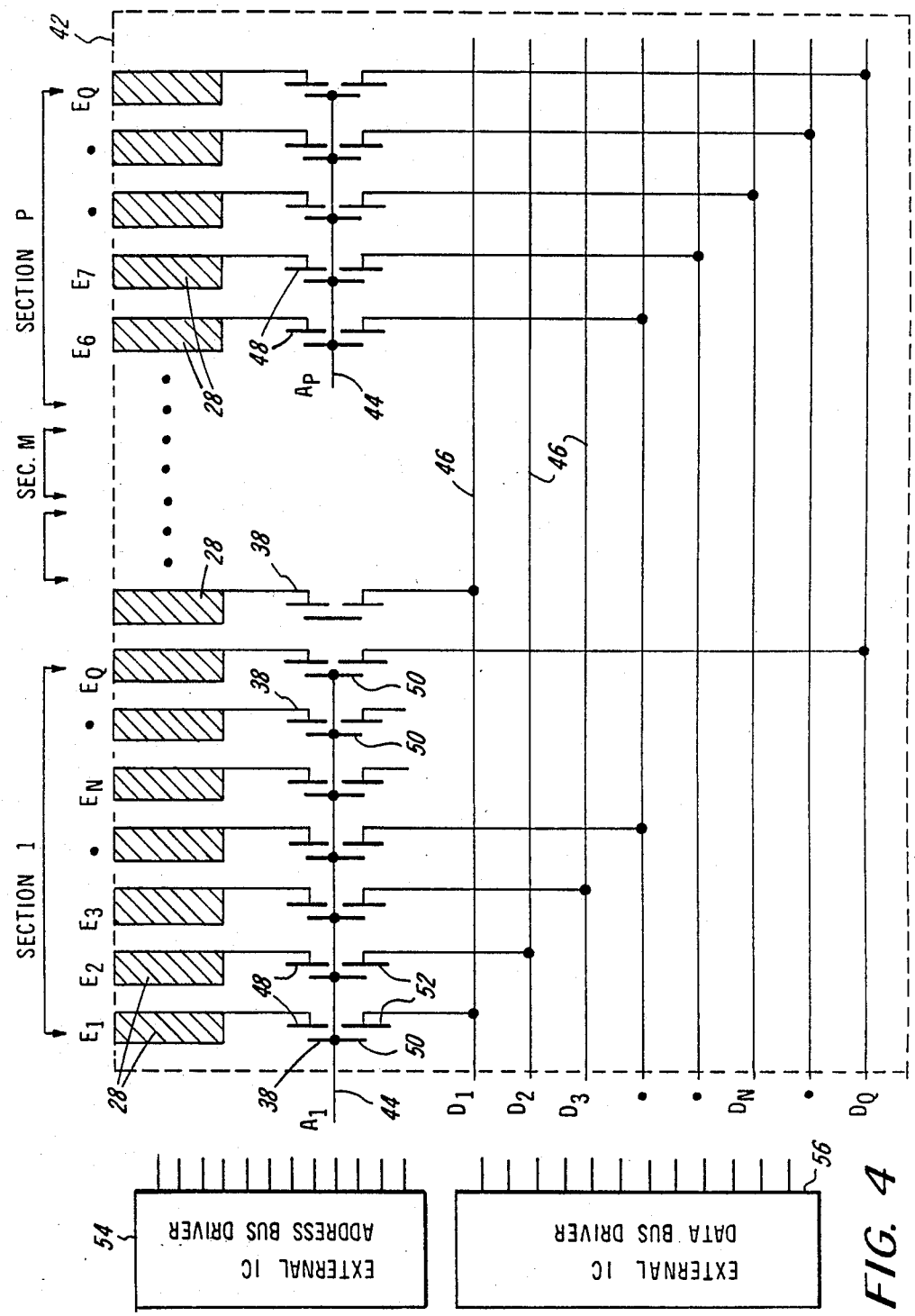
FIG. 4 is a schematic representation of the marking head of the present invention showing the modulation electrodes, the switching elements and the multiplexed driver circuitry.

The marking head 29 of the present invention comprises the elements schematically illustrated in FIG. 4, supported upon a planar substrate 42 (represented by the dotted outline). These elements include an array of modulation electrodes (E) 28 and a multiplexed data entry or loading circuit, comprising a small number of address bus lines (A) 44 and data bus lines (D) 46. As it is a purpose of this invention to provide a low cost marking system in which each of the modulation electrodes in the array is individually switchable while simultaneously reducing the number of wire bonds required to interface the electrodes with the external driver circuits, thin film switching elements 38 are fabricated directly on the marking head between the electrodes 28 and the data bus lines 46 so that no wire bonds are required.

For simplicity of fabrication over the large area, full page-width head, the switches 38 are preferably amorphous silicon thin film transistors (a-Si:H TFTs), although other materials such as polycrystalline Si, laser annealed Si, CdS, Te, or ZnO may be used. As shown, each modulation electrode 28 is connected to the drain electrode 48 of the thin film transistor, an address bus line 44 is connected to the gate electrode 50, and a data bus line 46 is connected to the source electrode 52. Since the number of address bus lines and data bus lines is reduced to a very small number through a multiplexing scheme (described below), the number of wire bonds required will be kept to a minimum. Wire bonding will be necessary between external IC address bus drivers 54 and the address bus lines 44, and between the external IC data bus drivers 56 and the data bus lines 46.

The multiplexing arrangement for the making head array of N modulation electrodes and N a-Si:H TFT switches comprises: p sections, or groups, of electrode/switch pairs, each section having q electrode/switch pairs (where $N = p \times q$); p address bus lines for addressing the selected section; and q data bus lines for bringing the modulation electrodes in the selected section to their predetermined voltages. In each section, all the gate electrodes of the a-Si:H TFT switches are connected to a single address bus line 44 in order that the switches in that section can be switched ON (conducting condition) or OFF (non-conducting condition), simultaneously. The source electrodes 52 of corresponding a-Si:H TFTs in each section are connected to the same data bus line 46, i.e. the source electrode of the $n^{th}$ ($1 \leq n \leq q$) a-Si:H TFT in each section is connected to data bus line $D_n$.

Only one of the address bus lines is energized at a time. Thus, when an activating signal is applied to the $m^{th}$ ($1 \leq m \leq p$) address bus line 44 ($A_m$), every one of the q a-Si:H TFTs in the $m^{th}$ section is turned ON, while the a-Si:H TFT switches of all the other sections remain OFF. The q modulation electrodes in the $m^{th}$ section will be charged or discharged to electrical potentials equal to those on the corresponding q data lines $D_1$ to $D_q$ by currents flowing through the q a-Si:H TFTs. Then the a-Si:H TFTs in the $m^{th}$ section will be turned OFF simultaneously, by returning address line $A_m$ to ground potential, and the a-Si:H TFTs in the $(m+1)^{th}$ section will be turned ON by pulsing the address line $A_{m+1}$ to a positive potential. At the same time, new data will be fed to and appear on the data lines $D_1$ to $D_q$ so that the modulation electrodes in this new $(m+1)^{th}$ section will in turn be charged or discharged to potentials corresponding to the new data on the data bus lines.

Several definitions are important here: "charging time" (or discharging) means that time necessary for passing enough current through the a-Si:H TFT switch, to bring a modulation electrode to 90% of the voltage on its respective data bus line; "loading time" means the time allocated to address each section after which the section is disconnected from the data bus lines, it is the "line time" divided by the number of sections, where the "line time" is the time to print a line of information, i.e. the time span from addressing a section until it is next again addressed. The only time constraint on the selection of the TFT switching device is that its current characteristics are such that the charging time is less than the loading time.

After the predetermined signal voltages are loaded onto the modulation electrodes of a selected section, the a-Si:H TFTs in that section are switched OFF. By the nature of the present marking process, each modulation electrode will remain at its applied voltage level until its associated switch is again switched ON for loading the next line of information. This is because in the OFF state, the a-Si:H TFT conducts substantially no current, allowing the charge to be held on the modulation electrode, and because the modulation electrode draws no current during the "writing" process, since during "writing", ions entrained in the transport fluid either pass unaffected, between the modulation electrode and the opposite grounded wall or are repelled toward the grounded opposite wall. Thus, the present marking process is "continuous", in that it will continue to "write" for substantially the entire line time even after it is disconnected from the external potential source.

Since only the loading of information is time multiplexed, and the "writing" process is continuous, one has the entire line time, instead of only a small fraction of the line time, during which to control the ions passing though the outlet channel. The increased time allows a lower ion density to supply the amount of ions required to make a satisfactory spot on the paper. This significantly reduces the requirement on the ion generation capacity of the ion generation chamber, thus further reducing the manufacturing cost of the system.

Since the TFT switches, herein, need merely supply a very small charge to bring the modulation electrodes to their desired voltage and no current passes therethrough during the "writing" process, the relatively small current capability of the a-Si:H TFT is more than adequate to perform the information loading task assigned to it. Ordinarily, one would expect to use the much faster crystalline silicon transistor switch, which would charge the modulation electrode in the nanosecond range. However, a-Si:H TFTs which charge the modulation electrode in the microsecond range (a thousand-fold difference), are aptly suited for the present purpose, as will become apparent.

In view of the fact that a-Si:H TFT switching elements may be used, the large area (8.5 inches or more) monolithic marking head may be simply fabricated by standard thin film deposition processes. The low temperature a-Si:H fabrication process involved allows a large degree of freedom in the choice of substrate materials, enabling the use of inexpensive amorphous materials such as glass, ceramics and possibly some printed circuit board materials. Preferably, the substrate is glass, and the modulating electrodes the address and data buses and other interconnections are metallic.

The magnitude of the positive voltage needed to achieve complete deflection of the fluid transported ions passing through the outlet channel depends upon the gap separation between the ion modulation electrode and the opposite wall, the velocity of the ions, and the length of the modulation electrode. In general, the modulation voltage is inversely proportional to the length of the modulation electrode and directly proportional to the ion velocity. In turn, the modulation voltage will affect the charging time. Typically, the electrode is 30 mils long and the modulation voltage is of the order of 10 to 30 volts.

The charging time is affected by the capacitance across the modulation electrode/opposite wall capacitor. The capacitance (C) is represented by the equation $$C = \epsilon A / d$$

where $\epsilon$ is the dielectric constant (in this case, air), A is the area of the modulation electrode, and d is the gap distance between the capacitive surfaces (from the electrode to the ground plane, across the outlet channel). Representative dimensions would be, for example, an electrode width of about 2.4 mils (typical in a 300 spi printer), an electrode length of 30 mils, and a gap between the modulation electrode and the ground plane of about 5 mils. Therefore, with $$\epsilon_{(air)} = 8.86 \times 10^{-14} \text{ farads/cm},$$

$$A = (2.4 \times 30)(25 \times 10^{-4})^2 \text{ cm}^2, \text{ and}$$

$$d = (5)(25 \times 10^{-4}) \text{ cm}$$

the capacitance would be $3.2 \times 10^{-15}$ farads.

Such a small capacitance enables the modulating electrode to be charged to the desired 20 volts in less than 1 $\mu$sec, by a current of 1 $\mu$amp. This is well within the performance characteristics of a-Si:H TFTs, thereby enabling these active devices to be incorporated into the making head. Although the charging and discharging speeds of the a-Si:H TFTs represent the slowest link in the system response time, they are fast enough. The other marking head elements, address bus lines and data bus lines, are driven by external IC chips with large current driving capabilities and, therefore, can be brought up or down to the desired potentials so fast that they do not represent system limitations.

For a 300 spi printer, printing at a speed of 1.5 inches/second, the time allocated to print a line of information is about 2 msec (line time). Considering a multiplexing scheme with 50 sections (q), that would leave 40 $\mu$sec per section (loading time) to being the modulation electrodes up or down to the desired voltage. Since the charging time should be only about 1 $\mu$sec, there is sufficient time to accomplish loading of the electrodes in each section. The remainder of the 2 msec line time is used for "writing".

A low cost marking head incorporating modulation electrodes, thin film switching devices, address and data buses, all integrally fabricated upon a single, inexpensive substrate, has been described. It includes a-Si:H TFT switches which, ordinarily, would be discarded out of hand, as a switching devices for a high speed printer because of their relatively small current capability, resulting in their relatively slow response time. However, when used in the fluid jet assisted ion projection electrographic marking apparatus, it has been shown that they are uniquely compatible. This is because (a) the fluid jet assisted ion printing process is controlled by modulation electrodes which do not need to draw current during "writing" and hold their charges for the entire line time, and (b) because the a-Si:H TFT switches do not allow the charge to be drained away during their OFF state, and their charging time is shorter than the system loading time.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A fluid jet assisted electrographic marking apparatus for placing electrostatic charges upon a charge receptor surface in an image-wise pattern, including means for supplying a transport fluid, housing means including an upstream ion generation region and a downstream ion modulation region, said housing means including inlet means for receiving transport fluid from said means for supplying, located upstream of said ion generation region, ion modulation means located at said ion modulation region, and outlet means from which transport fluid exits said housing, said ion modulation means being characterized by comprising charge storage means, comrising electrically conductive electrodes positioned adjacent the path of said transport fluid in said ion modulation region, for controlling the passage of ions out of said housing, said charge storage means being divided into sections, charging means for applying predetermined voltages to said sections in accordance with said image-wise pattern, means for selectively and sequentially coupling said charge storage means in a given section to said charging means and for isolating non-selected sections from said charging means, whereby said charge storage means in a given section are brought to the predetermined voltage when coupled and hold the predetermined voltage when isolated, for controlling the passage of ions out of said housing, and said electrodes, said charging means and said means for selectively and sequentially coupling are thin film elements integrally fabricated upon a substrate.

2. The fluid jet assisted electrographic marking apparatus as defined in claim 1 characterized in that said charge storage means comprises an array of capacitors across said outlet means including said electrically conductive electrodes located on one side of said outlet means.

3. The fluid jet assisted electrographic marking apparatus as defined in claim 1 characterized in that said means for selectively and sequentially coupling includes an array os switch means, coequal in number and electrically connected to said electrodes, and address buses electrically connected to said switch means for dividing said switch means and said electrodes into sections.

4. The fluid jet assisted electrographic marking apparatus as defined in claim 1 characterized by comprising N electrodes divided into p sections, each section including q electrodes, said charging means comprises q data buses, and said means for selectively and sequentially coupling comprises N switches divided into p sections, each section including q switches, each of said q switches electrically connected to an electrode, and p address buses, each electrically connected to and controlling a single section of switches.

5. The fluid jet assisted electrographic marking apparatus as defined in claim 4 characterized in that said switches comprise amorphous silicon thin film transistors.

6. The fluid jet assisted electrographic marking apparatus as defined in claim 5 characterized in that said address buses are connected to the gate electrodes of said thin film transistors, and said electrodes and said data buses are connected to the source and drain electrodes of each of said thin film transistors.

7. The fluid jet assisted electrographic marking apparatus as defined in claim 1 characterized in that said means for selectively and sequentially coupling includes thin film active devices.

8. The fluid jet assisted electrographic marking apparatus as defined in claim 7 characterized in that said thin film active devices comprise amorphous silicon transistors.

9. The fluid jet assisted electrographic marking apparatus as defined in claim 1 characterized in that said means for selectively and sequentially coupling includes amorphous silicon thin film transistor switches.

10. A fluid jet assisted electrographic marking apparatus for placing electrostatic charges upon a charge receptor surface in an image-wise pattern, including means for supplying a trasnport fluid, housing means including an upstream ion generation region and a downstream ion modulation region, said housing means including inlet means for receiving transport fluid from said means for supplying, located upstream of said ion generation region, ion modulation means located at said ion modulation region, and outlet means from which transport fluid exits said housing, said ion modulation means being characterized by comprising an array of charge storage means comprising electrically conductive electrodes, positioned adjacent the path of said transport fluid in said ion modulation region, for controlling the passage of ions out of said housing, charging means for applying predetermined voltages to said electrodes in accordance with said image-wise pattern, means for selectively coupling said charge storage means to said charging means, whereby said selected storage means is brought to the predetermined voltage when coupled, and holds the predetermined voltage when decoupled, for controlling the passage of ions out of said housing, and said electrodes, said charging means said means for selectively coupling are thin film elements integrally fabricated upon a single substrate.

11. The fluid jet assisted electrographic marking apparatus as defined in claim 10 characterized in that said means for selectively coupling comprises amorphous semiconductor transistors.

12. The fluid jet assisted electrographic marking apparatus as defined in claim 10 characterized in that said means for selectively coupling comprises amorphous silicon transistors.

* * * * *